United States Patent [19]

Lizee

[11] 4,230,575
[45] Oct. 28, 1980

[54] UNIFORM DISTRIBUTION OF A LIQUID OVER A FILTER SURFACE

[75] Inventor: Dominique Lizeè, Rouen, France

[73] Assignee: Rhone-Poulenc Industries, Paris, France

[21] Appl. No.: 14,151

[22] Filed: Feb. 22, 1979

[30] Foreign Application Priority Data

Feb. 22, 1978 [FR] France .............................. 78 05011

[51] Int. Cl.² ...................... B01D 23/20; B01D 33/38
[52] U.S. Cl. ................................... 210/780; 210/456
[58] Field of Search .................. 210/65, 405, 456, 77

[56] References Cited

U.S. PATENT DOCUMENTS

| | | | |
|---|---|---|---|
| 2,039,573 | 5/1936 | Weber | 210/456 X |
| 3,262,574 | 7/1966 | Parmentier | 210/393 |
| 3,426,908 | 2/1969 | Davis et al. | 210/401 |
| 3,540,596 | 11/1970 | Bugbee et al. | 210/405 X |
| 4,053,407 | 10/1977 | Nordengren | 210/456 X |

Primary Examiner—William A. Cuchlinski, Jr.
Attorney, Agent, or Firm—Burns, Doane, Swecker & Mathis

[57] ABSTRACT

Liquid/solids feed to be filtered is uniformly distributed over a filter surface by (i) initially, continuously introducing said liquid/solids feed into the feeder compartment of a compartmentalized, partitioned feed-distribution box, said feeder compartment having a volume such that no decantation results, (ii) continuing such feed as to effect an overflow of feed from said feeder compartment into a second, distribution compartment, over a partition or common wall member therebetween, via a plurality of outlet openings shaped into the top of said partition along the length thereof and being sufficiently few in number such that the rate of flow of the liquid/solids stream flowing through each opening is high, and (iii) thence uniformly cascading the entire flow of liquid/solids stream to be filtered onto suitable filter surface, advantageously after a change in the downward direction thereof.

26 Claims, 3 Drawing Figures

UNIFORM DISTRIBUTION OF A LIQUID OVER A FILTER SURFACE

BACKGROUND OF THE INVENTION

1. Field of the Invention

The present invention relates to method and apparatus for the improved uniform distribution of a liquid over a filter surface, and, more especially, relates to the uniform distribution of a slurry or wash liquid over a flat, horizontal filtering surface, e.g., a continuous vacuum filter. By "wash liquid" as utilized herein, there is intended any liquid which may upon use become saturated, loaded or greatly contaminated with solids.

2. Description of the Prior Art

In the known filters of the subject type, irregularity in flow or distribution may reduce the filtering capacity and the yield of the wash process. The regularity of the flow of the product to be filtered or of the wash liquid is typically assured by means of feed-distribution boxes.

Specifically, there are known feed-distribution boxes which, when mounted above a moving, e.g., rotating, filter surface, have a width essentially equal to that of the filter medium surface and wherein the product to be filtered is serially introduced into two successive compartments, passing from one compartment to the other via an overflow partition. Feed-distribution boxes of this type are especially adapted for the horizontal filter described in U.S. Pat. No. 3,262,574 which is suited for filtration of phosphoric acid slurries having a high solids content in gypsum. This device affords a good distribution of solids and a minimum risk of decantation of the slurries to be filtered. It also exhibits the advantage of depositing the slurry onto the filter in the downward direction and not by means of an overflow system, which would be dependent on the box being precisely horizontal.

There too is known the apparatus described in published French Patent Application No. 2,322,640 [Belgian Pat. No. 845,843], wherein the homogeneity of a slurry to be filtered is attained by means of a vertically adjustable partition between the two compartments; further, the apparatus of U.S. Pat. No. 3,626,486 is also known, same illustrating the known system of overflow and insures the uniformity of flow onto a circular filter by means of a gate having a variable opening. Cf. U.S. Pat. No. 3,426,908; *Proceedings of the 16th Annual Meeting, Fertilizer Industry Round Table*, pp. 52–60 (1966).

Nonetheless, a need still exists in this art for further insuring absence of decantation in such systems, and concomitant avoidance of any clogging of the filter media.

SUMMARY OF THE INVENTION

Accordingly, a primary object of the present invention is to provide a compartmentalized feed-distribution box, said box being especially adapted for filtration of high solids content liquids.

Another object of the invention is to provide a feed-distribution box which minimizes risk of decantation and concomitant clogging of the filter medium, especially when operating at low feed rates.

Briefly according to the invention, the uniform distribution of a liquid feed to be filtered is effected over suitable filter surface, e.g., a flat, horizontal filter medium, said distribution being characterized (a) in that the liquid feed is initially continuously introduced into the first or feeder compartment of a compartmentalized, partitioned feed-distribution box, said feeder compartment having a volume such that no decantation occurs, (b) continuing such introduction as to permit the feed liquid to overflow said first compartment into a second compartment, over a partition or common wall member via a plurality of outlet openings shaped into the top of said partition along the length thereof and being sufficiently few in number such that the flow rate of the liquid stream passing through each opening is high, and (c) thence cascading the entire flow of the liquid to be filtered onto the filter surface, advantageously after a change in the downward direction thereof.

The surface area of each outlet opening is calculated so that the rate of flow of the liquid to be filtered is in proportion at each point on the filter surface, i.e., is such that an equal amount of feed liquid contacts each unit of surface area of the filter.

DETAILED DESCRIPTION OF THE INVENTION

Figure 1:
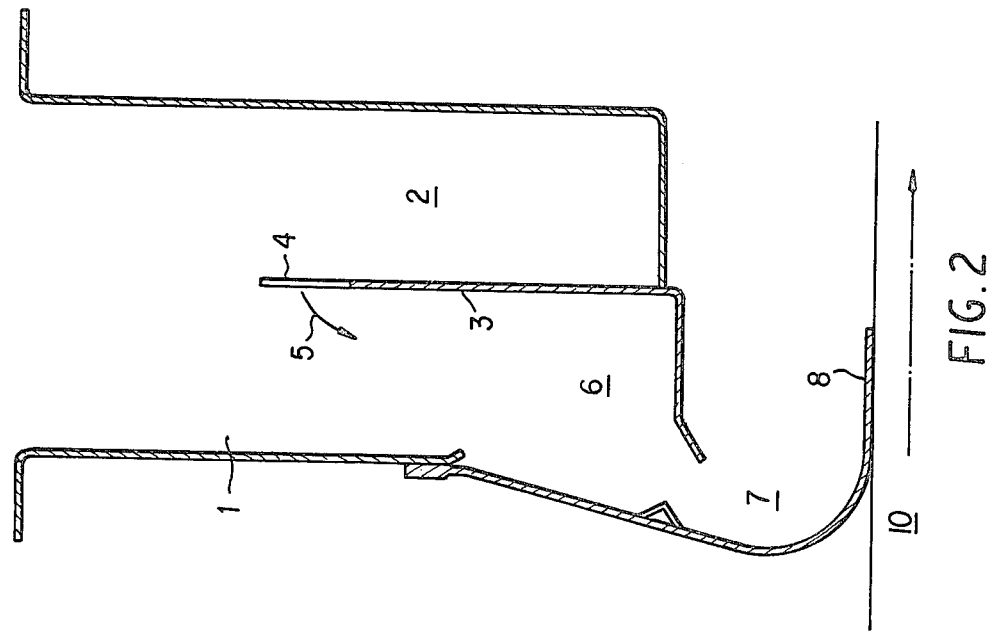
FIG. 1 is a vertical cross-sectional view of the feed-distribution box illustrated in FIG. 3, taken along the perpendicular plane B therethrough.

More particularly, in a continuous filtration operation according to the invention, the surface area of each outlet opening is calculated such that it is in proportion to the moving filter element passing therebeneath. In this manner, a regular rate of flow and, consequently, a homogeneous wash over the entire surface of the filter, is obtained, together with the deposition of a filter cake having constant thickness in the case of a high solids content feed liquid. This manner of feed is stable over time without clogging of the filter element of the apparatus.

The process of the invention is conveniently carried out utilizing a liquid feed-distribution device comprising, in combination, and which comprises a compartmentalized feed-distribution box, a first compartment, or feed compartment, provided with feed liquid inlet means, and defined by a bottom wall member, a pair of upright endwall members and a pair of vertical sidewall members differing in height, with the front upright sidewall member being shorter in height than the rear upright sidewall member, and establishing an overflow weir and common upright wall member, whereby means are established such that feed liquid introduced into said feed compartment ultimately overflows said lower, front wall or overflow member and cascades into a second or distribution compartment, said second compartment also being comprised of upright bottom, end- and sidewall members, with the front sidewall member thereof being parallely opposite said overflow means [which means also define the rear endwall member of said second compartment] and being provided with a longitudinally extending outlet opening along the base of the front wall member and along the proximal end of the bottom wall member of said second compartment. The top edge of the overflow weir is continuously serrated, advantageously virtually saw-toothed, to establish a plurality of outlet ports for the liquid overflowing the first compartment into the second compartment. Most preferably the serrations are each in the configuration of an inverted triangle, thus ensuring a high rate of velocity for the overflowing liquid at the lowermost points of each inverted triangle, i.e., through that area of each triangle which would comprise its apex in normal upright position, and at which points the risk of clogging would normally be greatest. Quite advantageously, the inverted triangles or serrations are spaced apart by a distance of, for example, between 200 and 400 mm along the overflow edge; also, preferably, each inverted triangle has a depth of between about 100 to 200 mm.

It is also envisaged to construct the bottom wall member of the feed compartment as to be progressively downwardly inclined, from back to front, to facilitate the emptying of such compartment and to further reduce the risk of decantation.

The distribution or second compartment may additionally be equipped with a sheet of flexible material secured to its front wall member, opposite the overflow or common wall member and conforming at its base end to the shape of the filter surface. This further assists in regulating the flow of the wash liquid and in the gentle introduction of the wash liquid at the level of the filter cake.

The device of the invention is especially adapted for a continuous, circular, rotating vacuum filter of the table or tilting pan type.

The process and apparatus of the invention may be advantageously applied for the feed and distribution over a filter surface of phosphoric acid slurries comprising calcium sulfate solids. More particularly, same are most useful for processing a wash liquid comprising calcium sulfate solids.

Another advantageous application of the process of the invention is for the processing of phosphoric acid slurries originating from various phosphoric acid purification cycles.

Figure 2:
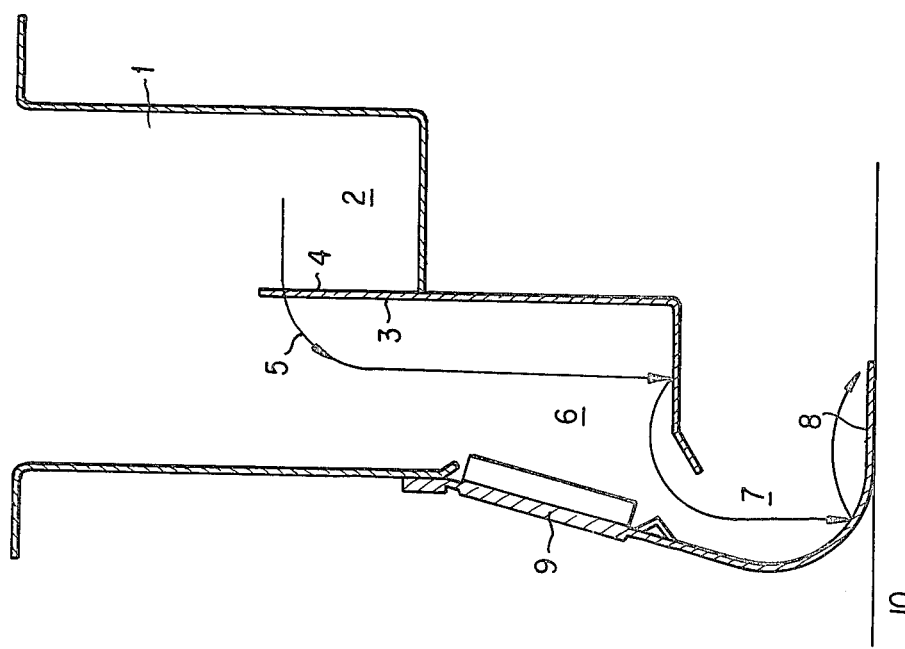
FIG. 2 also is a vertical cross-sectional view of the feed-distribution box illustrated in FIG. 3, but taken along the perpendicular plane C therethrough.
Figure 3:
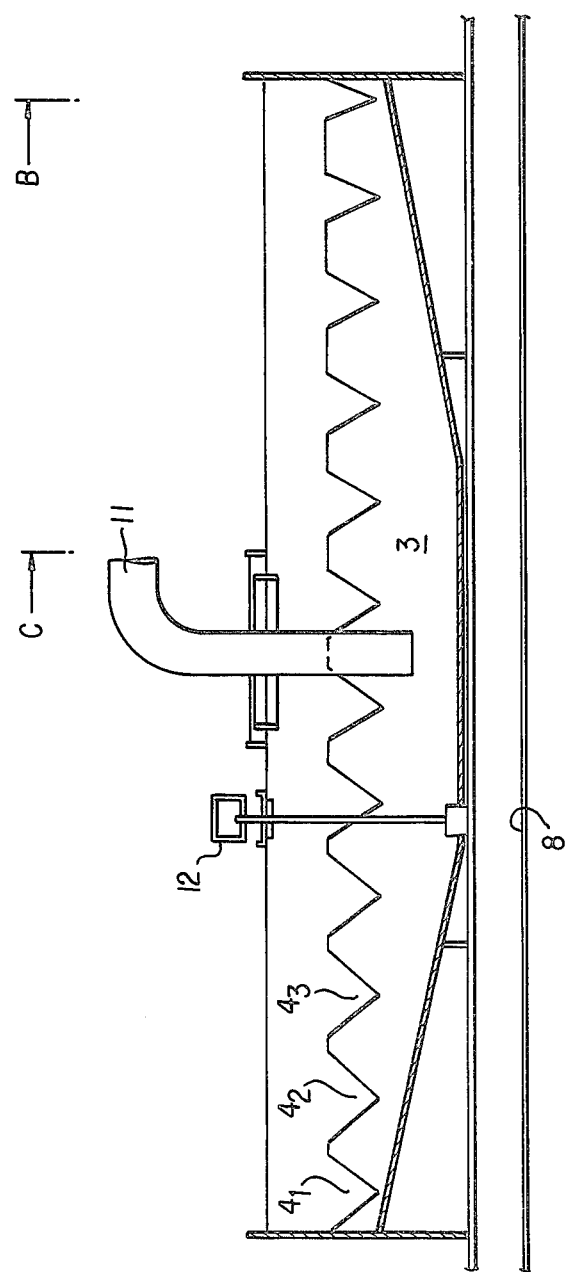
FIG. 3 is an elevational view, partly in section, of a liquid feed-distribution box according to the invention.

In a preferred embodiment according to the invention, the feed-distribution box as illustrated in the FIGS. 1, 2 and 3 is utilized.

FIGS. 1 and 2 depict the feed-distribution box 1 in side cross-section and FIG. 3 depicts same in rear elevation, partially in cross-section. As shown, feed liquid from an inlet 11 is charged into the feed compartment 2, ultimately filling same and cascading over the overflow 3 via the inverted, triangular serrations $4_1$, $4_2$, $4_3$, etc., and next cascades in the direction 5 into the distribution compartment 6, there being dispersed either by single or double cascade, and thence flowing onto the moving filter surface 10 via longitudinally extending outlet opening 7. A sheet of flexible material 8, secured at 9 to the front wall member of the compartment 6, is of such configuration as to conform at its base end to the shape of the moving filter surface 10. It too will be seen that, due to such arcuate configuration of the skirt 8, the flow of liquid is subjected to a change of direction upon impinging thereon, thus enhancing the homogeneity thereof.

In FIG. 2, the feed compartment 2 is deeper than in FIG. 1, albeit the direction and general characteristics of the flow remain the same.

FIG. 3 illustrates in greater detail the triangular serrations $4_1$, $4_2$, $4_3$, etc., and the feed liquid inlet means. In this Figure, the dimensions of the several triangular serrations or outlet ports were designed for application of the box to a flat, horizontal circular filter, the left-hand portion of said Figure being the external edge of the circle.

At the base of the skirt 8, the edge of the sheet of flexible material is exposed to flow of the entire mass of the liquid to be filtered, until same contacts the filter surface. At 12, a dismantling device is shown; this device may be eliminated, if desired.

In one particular example of a feed-distribution device according to the invention, adapted for a horizontal, rotating table filter, such as is described in U.S. Pat. No. 3,262,574, the triangular openings in the overflow weir had the following dimensions in mm, per a height of 150 mm:

| $4_1$ | $4_2$ | $4_3$ | $4_4$ | $4_5$ | $4_6$ | $4_7$ | $4_8$ | $4_9$ | $4_{10}$ | $4_{11}$ | $4_{12}$ |
|---|---|---|---|---|---|---|---|---|---|---|---|
| 356 | 338 | 320 | 302 | 284 | 264 | 246 | 228 | 210 | 192 | 174 | 154 |

The aforesaid sizes were calculated to be proportional to the square of the distances to the center, which had the effect of assuring regular and uniform distribution of the liquid upon the circular filter. In this example, the inverted, triangular outlet opening had surface areas ranging from 267 to 115 cm$^2$, large enough to enable a high rate of flow and to prevent clogging.

It too will be apparent that regular and uniform distribution over a rectangular filter surface would be assured by utilizing a plurality of outlet ports equal in size and shape.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A method for the uniform distribution of a liquid/-solids feed to be filtered over a filter surface, comprising (i) initially, continuously introducing liquid/solids feed into the feeder compartment of a compartmentalized, partitioned feed-distribution box, said feeder compartment being dimensioned such that the volume for each unit length of the compartment progressively decreases away from the location of the introduction of the liquid/solids feed into the feeder compartment, (ii) continuing such feed as to effect an overflow of feed from said feeder compartment into a second, distribution compartment, over a common, partition wall member therebetween, via a plurality of outlet openings shaped into the top of said partition along the length thereof and being of a number such that a high rate of flow therethrough is assured, and (iii) thence uniformly cascading the overflow of liquid/solids stream onto suitable filter surface.

2. The method as defined by claim 1, wherein the surface area of each outlet opening is such that an equal amount of feed contacts each unit of surface area of the filter surface.

3. The method as defined by claim 2, wherein serrations in the partition define said outlet openings.

4. The method as defined by claim 3, said serrations comprising inverted triangles.

5. The method as defined by claims 3 or 4, the feed being uniformly tangentially cascaded onto the filter surface after a change in the downward direction thereof.

6. The method as defined by claim 3, said filter surface comprising a horizontal, rotating circular filter.

7. The method as defined by claim 6, wherein the area of each serration progressively increases from the edge of the feeder compartment nearest the center of the circular filter to the edge of the feeder compartment nearest the periphery thereof.

8. The method as defined by claim 7, wherein the area of each serration is proportional to the square of the distance from the serration to the center of the circular filter.

9. The method as defined by claim 3, said liquid/solids feed comprising a phosphoric acid slurry including calcium sulfate solids.

10. The method as defined by claim 3, said liquid/solids feed comprising a wash liquid including calcium sulfate solids.

11. The method as defined by claim 3, said liquid/solids feed comprising a phosphoric acid slurry emanating from a phosphoric acid purification.

12. The method as defined by claim 3, the filter cake which results being homogeneous and uniform in thickness.

13. Apparatus for the uniform distribution of a liquid/solids feed over a filter surface, which includes a compartmentalized, partitioned feed-distribution box, comprising:
a feeder compartment having a bottom wall member, a pair of sidewall members, a back wall member, a front wall member defining an overflow weir and liquid/solids feed inlet means, the wall members of said feeder compartment being dimensioned such that the volume for each unit length of the compartment progressively decreases in a direction away from said liquid/solids feed inlet means; and
a distribution compartment having a back wall defined by said front wall member of said feeder compartment, a front wall member, a bottom wall member, a pair of sidewall members and an outlet opening for cascading feed flowing over said weir onto a filter surface.

14. The apparatus as defined by claim 13, the volume of said distribution compartment being greater than the volume of the feeder compartment.

15. The apparatus as defined by claim 13, further comprising means for tangentially uniformly cascading feed overflow onto a filter surface upon effecting a change in the downward direction thereof.

16. The apparatus as defined by claim 15, said feed cascade means comprising a flexible skirt member.

17. The apparatus as defined by claim 16, said skirt member being arcuate.

18. The apparatus as defined by claim 13 further including a plurality of outlet openings along the length of the top of said overflow weir.

19. The apparatus as defined by claim 18, wherein serrations in said feeder compartment front wall member define said outlet openings.

20. The apparatus as defined by claim 12, said serrations comprising inverted triangles.

21. The apparatus as defined by claim 13, said inverted triangles each being spaced apart a distance of from about 200 to 400 mm.

22. The apparatus as defined by claim 14, said inverted triangles each being from about 100 to 200 mm deep.

23. Apparatus as defined by claim 18 which is adapted for the distribution of a liquid/solids feed over a horizontal, rotating filter, wherein the areas of said outlet openings progressively increase from the side of the feeder compartment nearest the center of the circular filter to the side of the feeder compartment nearest the periphery thereof.

24. The apparatus as defined in claim 23, wherein the area of each opening is proportional to the square of the distance from the opening to the center of the circular filter.

25. Apparatus as defined in claim 18 which is adapted for the distribution of a liquid/solids feed over a rectangular filter, wherein the areas of said outlet openings are equal to one another.

26. The apparatus as defined in claim 13, wherein said feeder compartment bottom wall member is downwardly inclined toward said liquid/solids feed inlet means.

* * * * *